(12) United States Patent
Schimke et al.

(10) Patent No.: US 10,960,986 B2
(45) Date of Patent: Mar. 30, 2021

(54) SEAL ASSEMBLY FOR RETRACTABLE COMPONENTS

(71) Applicant: GOODRICH CORPORATION, Charlotte, NC (US)

(72) Inventors: Adam M. Schimke, Gilbert, AZ (US); Gerald Brandon Biehle, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/885,615

(22) Filed: May 28, 2020

(65) Prior Publication Data

US 2020/0331627 A1 Oct. 22, 2020

Related U.S. Application Data

(62) Division of application No. 16/387,972, filed on Apr. 18, 2019, now Pat. No. 10,703,505.

(51) Int. Cl.
| | |
|---|---|
| *B64D 47/02* | (2006.01) |
| *B64F 5/10* | (2017.01) |
| *F16J 15/3268* | (2016.01) |
| *F16J 15/453* | (2006.01) |

(52) U.S. Cl.
CPC .............. *B64D 47/02* (2013.01); *B64F 5/10* (2017.01); *F16J 15/3268* (2013.01); *F16J 15/453* (2013.01)

(58) Field of Classification Search
CPC ...... F16J 15/453; F16J 15/3268; B64D 47/02; B64F 5/10
See application file for complete search history.

(56) References Cited

U.S. PATENT DOCUMENTS

| | | | | |
|---|---|---|---|---|
| 7,080,928 B2 ‡ | 7/2006 | Barnhart | ............... | B64D 47/04 315/82 |
| 7,815,193 B2 ‡ | 10/2010 | Feistel | ............... | F16J 15/26 277/30 |
| 2011/0120263 A1 ‡ | 5/2011 | Short | ............... | F16J 15/453 74/606 R |
| 2015/0036368 A1 ‡ | 2/2015 | Rittner | ............... | B64D 11/00 362/471 |
| 2016/0332746 A1 ‡ | 11/2016 | Williams | ............... | B64D 47/02 |
| 2018/0087670 A1 ‡ | 3/2018 | Poster | ............... | F16J 15/453 |
| 2018/0215480 A1 ‡ | 8/2018 | Schmalz | ............... | F21V 23/002 |
| 2019/0329887 A1 ‡ | 10/2019 | O'Kell | ............... | F21K 9/90 |

OTHER PUBLICATIONS

USPTO, Restriction/Election Requirement dated Dec. 20, 2019 in U.S. Appl. No. 16/387,972.
USPTO, Notice of Allowance dated May 1, 2020 in U.S. Appl. No. 16/387,972.

‡ imported from a related application

*Primary Examiner* — Kevin Quarterman
(74) *Attorney, Agent, or Firm* — Snell & Wilmer L.L.P.

(57) ABSTRACT

A seal assembly includes a housing, a shaft, and a gland. The housing defines an opening and an annular retention channel, according to various embodiments. The shaft extends through the opening, and the shaft comprises a longitudinal axis, according to various embodiments. The gland may be disposed circumferentially around the shaft and may be movably retained within the annular retention channel. The gland is movable relative to the housing in a direction substantially perpendicular to the longitudinal axis, according to various embodiments.

9 Claims, 6 Drawing Sheets

SEAL ASSEMBLY FOR RETRACTABLE COMPONENTS

CROSS-REFERENCE TO RELATED APPLICATIONS

This application is a divisional of, claims priority to and the benefit of, U.S. Ser. No. 16/387,972 filed on Apr. 18, 2019 entitled "SEAL ASSEMBLY FOR RETRACTABLE COMPONENTS," which is incorporated herein by reference its entirety for all purposes.

GOVERNMENT LICENSE RIGHTS

This disclosure was made with government support under contract number MA10-RFP-17-219 awarded by the United States Air Force. The government has certain rights in the disclosure.

FIELD

The present disclosure relates to seal assemblies, and more specifically to seal assemblies for retractable components such as aircraft lights.

BACKGROUND

Retractable components, such as position lights for aircraft, are often controlled using a linear actuator. For example, an aircraft light may be deployed/extended (e.g., vertically) when in use and retracted when no longer in use. When deployed/extended, an aircraft light may experience loads that are perpendicular to the direction of actuation (i.e., lateral loads), which can cause the light to deflect laterally. In response to this deflection, water or other foreign objects may enter the light assembly and/or actuator assembly through temporarily deformed seals and cause damage and/or wear to the assembly.

SUMMARY

In various embodiments, the present disclosure provides a seal assembly that addresses one or more of the above mentioned shortcomings. In various embodiments, the present disclosure provides a seal assembly that includes a housing, a shaft, and a gland. The housing defines an opening and an annular retention channel, according to various embodiments. The shaft extends through the opening, and the shaft comprises a longitudinal axis, according to various embodiments. The gland may be disposed circumferentially around the shaft and may be movably retained within the annular retention channel. The gland is movable relative to the housing in a direction substantially perpendicular to the longitudinal axis, according to various embodiments (e.g., a radial direction).

In various embodiments, the movement of the gland refers to bulk movement of the gland such that the gland is configured to move in the direction as a whole. In various embodiments, a maximum outer diameter of the gland, perpendicular to the longitudinal axis of the shaft, is less than a maximum inner diameter of the annular retention channel, also perpendicular to the longitudinal axis of the shaft. In various embodiments, the gland comprises a self-lubricating or low friction material. In various embodiments, engagement between the gland and walls of the housing that define the annular retention channel form a labyrinth-style seal. The labyrinth-style seal may create a longer path for fluids to travel, and may provide a degree of seal using the parasitic friction between these fluids and the adjacent surfaces that form the labyrinth-style seal. In various embodiments, the labyrinth seal is maintained in response to movement of the gland in the direction. In various embodiments, the gland is fixed relative to the shaft in the direction such that the shaft and the gland are configured to be movable in the direction together.

In various embodiments, the seal assembly further includes an annular seal disposed circumferentially around the shaft such that the annular seal is disposed between the gland and the shaft, wherein the annular seal is in sealing engagement with the shaft. The annular retention channel defined by the housing may be a first annular retention channel, the gland may define a second annular retention channel, and the annular seal is disposed within the second annular retention channel. In various embodiments, the shaft is configured to translate along the longitudinal axis relative to the housing, the gland, and the annular seal. In various embodiments, the present disclosure also provides a light assembly of an aircraft. In such embodiments, a light head of an aircraft light may be the shaft mentioned above.

In various embodiments, the present disclosure also provides a method of manufacturing a light assembly of an aircraft. The method may include positioning an annular seal within a second annular retention channel defined by a gland and positioning the annular seal and the gland around a light head such that the annular seal is in sealing engagement with the light head. Still further, the method may include positioning the gland within a first annular retention channel defined by a housing and coupling the housing to the aircraft. The method may further include coupling the light head to a linear actuator (e.g., to facilitate the longitudinal/axial translation/motion).

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a seal assembly is provided herein. Generally, the seal assembly enables a shaft to be deflected laterally while still maintaining a seal around the shaft, according to various embodiments. For example, the seal assembly may be a light assembly of an aircraft, and the seal assembly may maintain a seal around a light head to prevent ingress of water or other foreign objects/material during use. While numerous details here are included herein pertaining to using the seal assembly in aircraft light implementations, the scope of the present disclosure is not limited to aircraft applications and thus the seal assembly described and claimed herein may be utilized in other applications.

Figure 1:
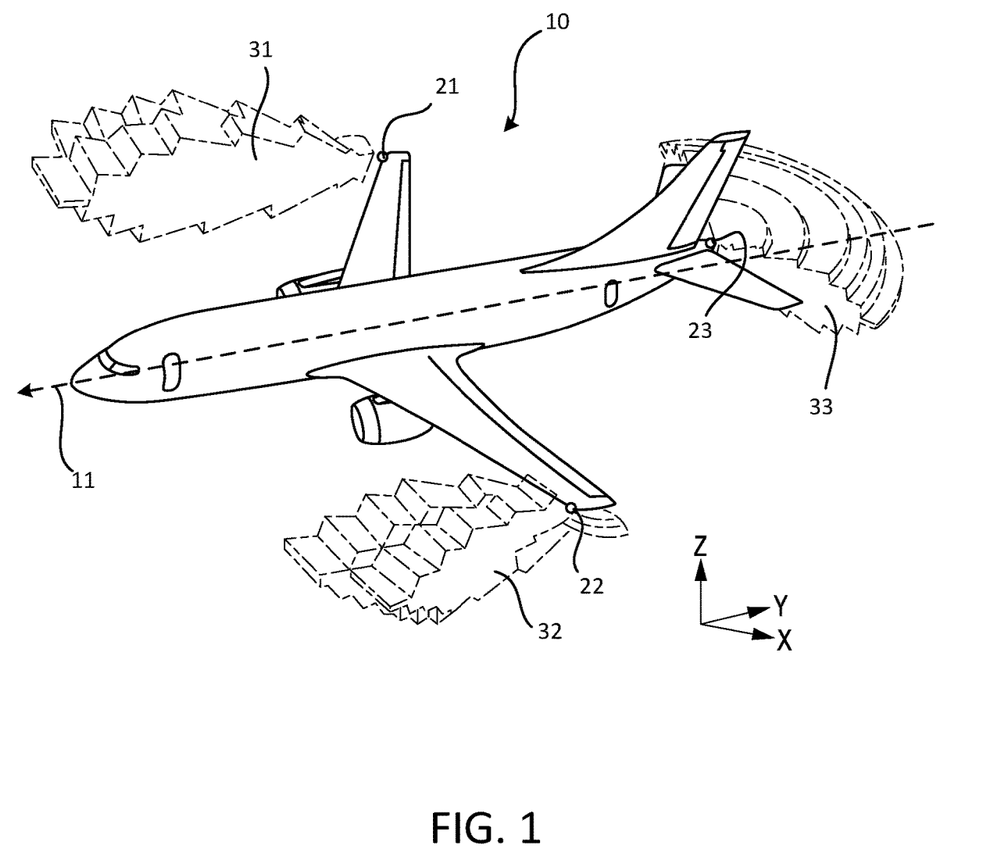
FIG. 1 is a perspective view of position light patterns of an aircraft, in accordance with various embodiments.

With reference to FIG. 1, and in accordance with various embodiments, an aircraft 10 generally includes a plurality of exterior lights. These lights may be retractable, and thus the lights may be deployed/extended when in use and retracted when not in use. For example, the aircraft may include forward facing position lights 21, 22 (e.g., outboard facing position lights) disposed on each side of the aircraft 10 and an aft position light 23 disposed at the rear of the aircraft. The forward position lights 21, 22 may be retractable/extendable and may be configured to emit specific colors (e.g., the right forward position light 21 may emit green visible light 31 and the left forward position light 22 may emit red visible light 32). Similarly, the aft position light 23 may be retractable/extendable and may be configured to emit while light 33. FIG. 1 also includes an indication of a direction of flight 11 of the aircraft 10. As mentioned above, in response to aircraft lights being extended, the force of airflow air against the extended lights (or other environmental conditions) may cause the light to deflect (e.g., deflect in a direction opposite the direction of flight 11).

Figure 2:
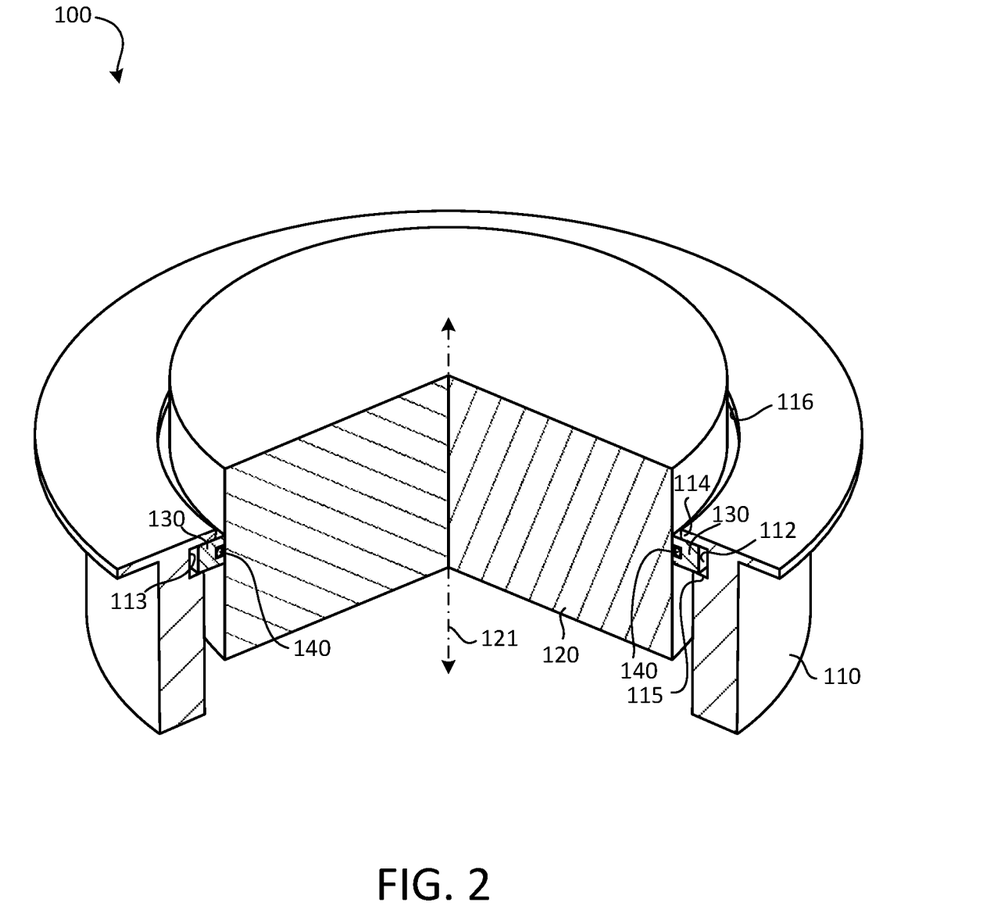
FIG. 2 is a perspective cross-section view of a seal assembly, in accordance with various embodiments.

In various embodiments, and with reference to FIG. 2, a seal assembly 100 is provided that enables a retractable shaft, such as a light head of an aircraft light, to deflect while still providing sufficient sealing engagement to prevent or mitigate ingress of water and/or foreign objects/materials. The seal assembly 100 generally includes a housing 110, a shaft 120, and a gland 130, according to various embodiments. The shaft 120, according to various embodiments, is an extendable/retractable element, such as a light head of an aircraft light, and the housing 110 comprises a rim 116 that defines opening through which the shaft 120 is configured to be extended and retracted. The shaft 120 may have a longitudinal axis 121, also referred to herein as simply the axis or the actuation axis, and the shaft 120 may be configured to move/translate along the longitudinal axis (or at least in a direction substantially parallel to the longitudinal axis 121). The gland 130 may be disposed radially between the housing 110 and the shaft 120. In various embodiments, the gland 130 is disposed circumferentially around the shaft 120 to facilitate and promote a sealing engagement against the shaft 120 during and between actuations (i.e., retraction and extension of the shaft). Thus, the term "gland," as used herein, generally refers to a sleeve or other such component disposed around the shaft 120 to facilitate the sealing engagement. In various embodiments, and as described in greater detail below, the seal assembly 100 also includes an annular seal 140 disposed between the gland 130 and the shaft 120.

The housing 110 may define an annular retention channel 112, and the gland 130 may be movably disposed and retained within the annular retention channel 112. Said differently, the gland 130 may be movable, relative to the annular retention channel 112 of the housing 110, in a direction that is substantially perpendicular to the longitudinal axis 121 of the shaft 120. That is, the gland 130 may slide laterally within the annular retention channel 112 to allow for deflection of the shaft 120 in response to lateral (e.g., perpendicular) loads when the shaft 120 is extended. In various embodiments, the gland 130 may be made from a self-lubricating material to facilitate this relative sliding of the gland 130 relative to the walls 113 of the housing 110 that define the annular retention channel 112. For example, the self-lubricating material of the gland 130 may be a plastic and/or polymer material having high mechanical strength/rigidity, impact resistance, moisture resistance, and/or chemical resistance. In various embodiments, the self-lubricating material of the gland 130 is an acetal homopolymer plastic with low porosity. For example, the self-lubricating material may be an acetal resin, such as Derlin ® 150 made by DuPont™.

Figure 3A:
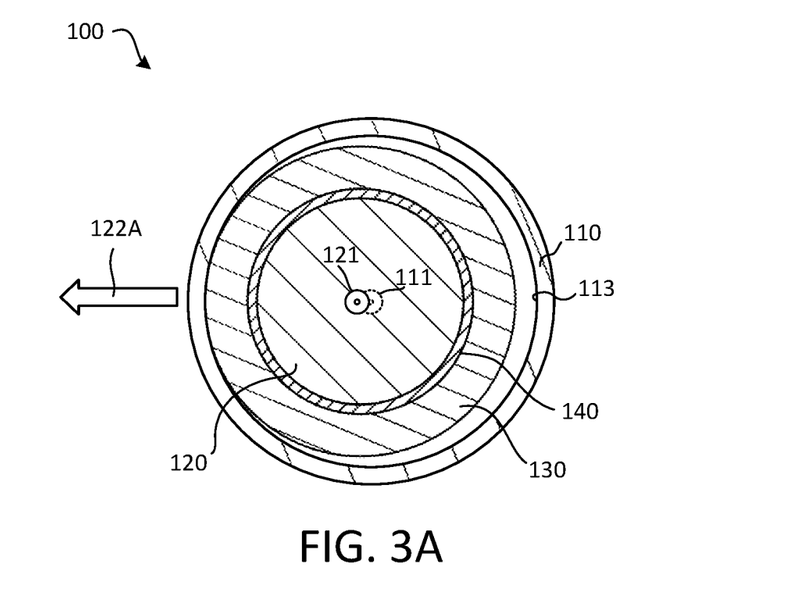
FIG. 3A is a cross-sectional view of a seal assembly in a first deflected position, in accordance with various embodiments.
Figure 3B:
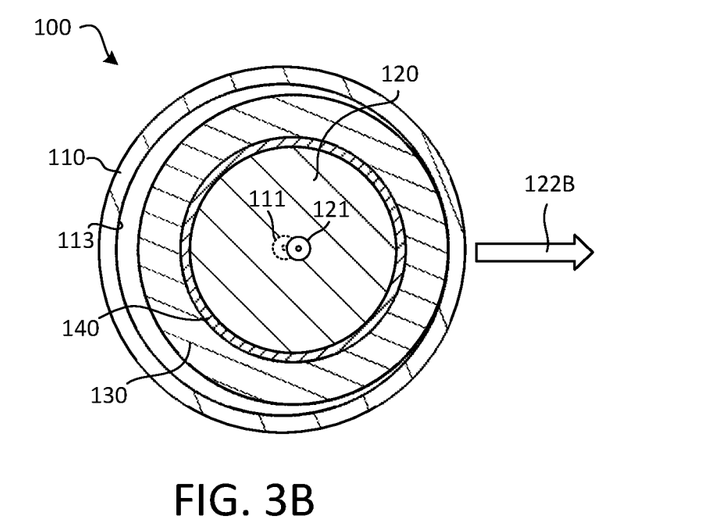
FIG. 3B is a cross-sectional view of a seal assembly in a second deflected position, in accordance with various embodiments.
Figure 4A:
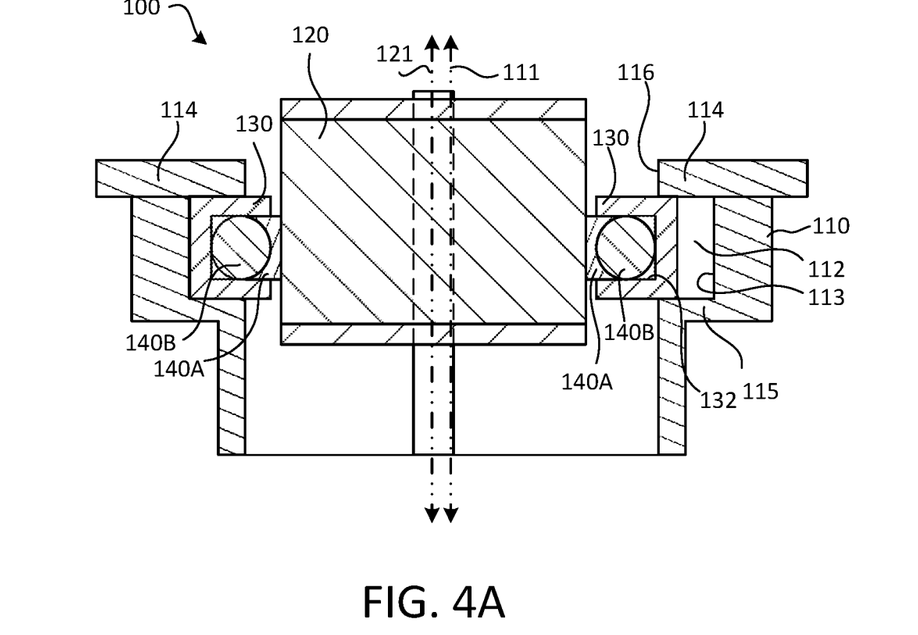
FIG. 4A is a cross-sectional view of a seal assembly in a first deflected position, in accordance with various embodiments.
Figure 4B:
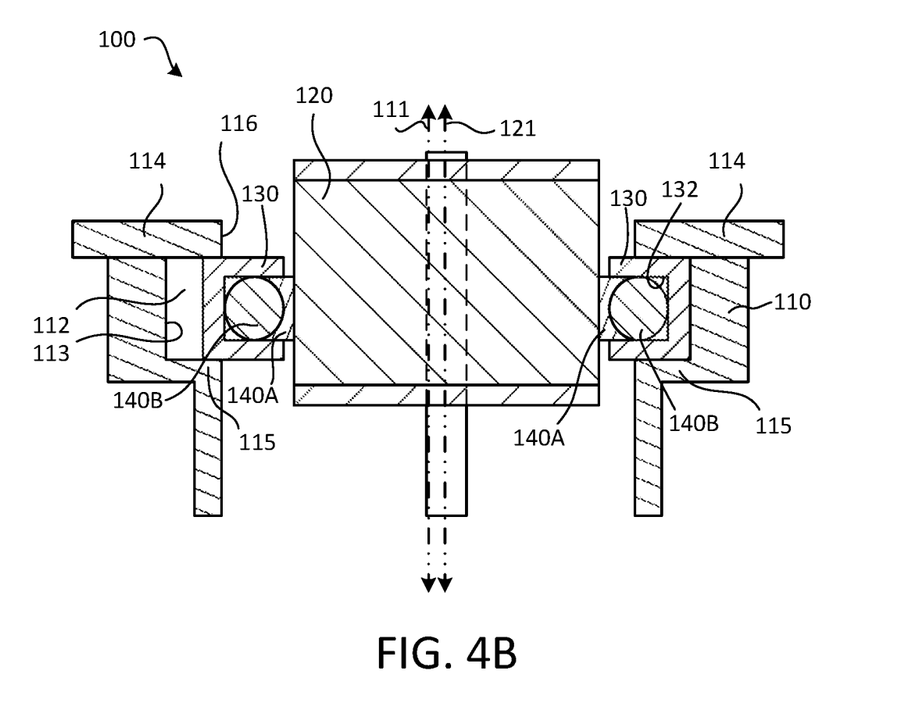
FIG. 4B is a cross-sectional view of a seal assembly in a second deflected position, in accordance with various embodiments.

In various embodiments, and with reference to FIGS. 3A, 3B, 4A, and 4B, the seal assembly 100 is shown in various deflected positions. For example, FIGS. 3A and 4A show the seal assembly 100 in a first deflected position and FIGS. 3B and 4B show the seal assembly 100 in a second deflected position. In various embodiments, the lateral/radial (i.e., deflecting) movement of the seal assembly accomplished via sliding engagement between the gland 130 and the housing 110. Said differently, the shaft 120, the annular seal 140, and the gland 130 may move laterally/radially as a unit (i.e., together as a whole) relative to the housing 110 in response to a deflecting load perpendicular to the longitudinal axis 121. In various embodiments, the gland 130 is a unitary structure and thus is not comprised of multiple arcuate sections.

In various embodiments, and with continued reference to FIGS. 3A, 3B, 4A, and 4B, the shaft 120, annular seal 140, and gland 130 move laterally/radially together in response to the deflecting load, and thus the position and size of the gap defined between wall 113 of the annular retention channel 112 and the outer surface of the gland 130 changes in response to the deflecting load. Said differently, a maximum outer diameter of the gland 130 (as measured perpendicular to the longitudinal axis 121 of the shaft 120), may be less than a maximum inner diameter of the annular retention channel 112 (also perpendicular to the longitudinal axis 121 of the shaft 120). This mismatch in diameters provides sufficient space for the gland to slide laterally/radially relative within the annular retention channel 112. Accordingly, the longitudinal axis 121 of the shaft 120 may deflect and move dynamically in response to the deflecting load while the gland 130 maintains sealing engagement with the housing 110. For example, the annular retention channel 112 may be defined by a retaining plate 114 (e.g., flange) and a shoulder 115 (FIGS. 2, 4A, and 4B) of the housing 110. The retaining plate 114 and shoulder 115 may axially retain the gland 130 in place and may form a labyrinth-type seal between the gland 130 and the housing 110. Furthermore, the labyrinth seal may be maintained as the gland 130 slides laterally/radially within the annular retention channel 112. Additional details pertaining to the seal between the gland 130 and the housing 110 are included below with reference to FIG. 6.

In various embodiments, and with continued reference to FIGS. 3A, 3B, 4A, and 4B, the centerline axis 111 of the housing 110 (e.g., an axis extending through a center of the opening defined by the rim 116 of the retaining plate/flange 114 of the housing 110) is offset from longitudinal axis 121 of the shaft 120 in response to deflection of the shaft 120. That is, the centerline axis 111 of the housing 110 and the longitudinal axis 121 of the shaft 120 may move out of alignment with each other (i.e., may be offset; may no longer be coaxial) in response to a deflecting load.

In various embodiments, and the annular seal 140 is disposed between a radially inward surface of the gland 130 and a radially outward surface of the shaft 120. The annular seal 140 generally maintains a sealing engagement with the shaft 120 as the shaft 120 is extended and retracted using, for example, a linear actuator. In various embodiments, the annular retention channel 112 of the housing 110 is a first annular retention channel 112 of the seal assembly 100, with the gland 130 defining a second annular retention channel 132 (FIGS. 4A and 4B). The annular seal may be disposed within the second annular retention channel 132. In various embodiments, the annular seal may include an elastomeric o-ring 140B and an elastomeric wiper 140A (e.g., a low friction elastomeric wiper). Said differently, the annular seal may be comprised of a low friction elastomeric wiper 140A extending circumferentially around and engaging the shaft 120 and an elastomeric o-ring 140B retained within the second annular retention channel 132 of the gland 130. In various embodiments, the elastomeric o-ring 140B provides a spring-like material between internal walls of gland 130 forming the second annular retention channel 132 and the elastomeric wiper 140A. For example, the elastomeric o-ring 140B may lag behind in its motion as it reacts to the lateral/radial forces. The elastomeric wiper 140A may provide an interference fit with the shaft, and this interference fit may be effective in restricting the flow liquids (e.g., water), gases, and foreign objects while allowing the shaft to move axially. The elastomeric wiper 140A may be made from a hard, low-friction plastic like polytetrafluoroethylene.

Figure 6:
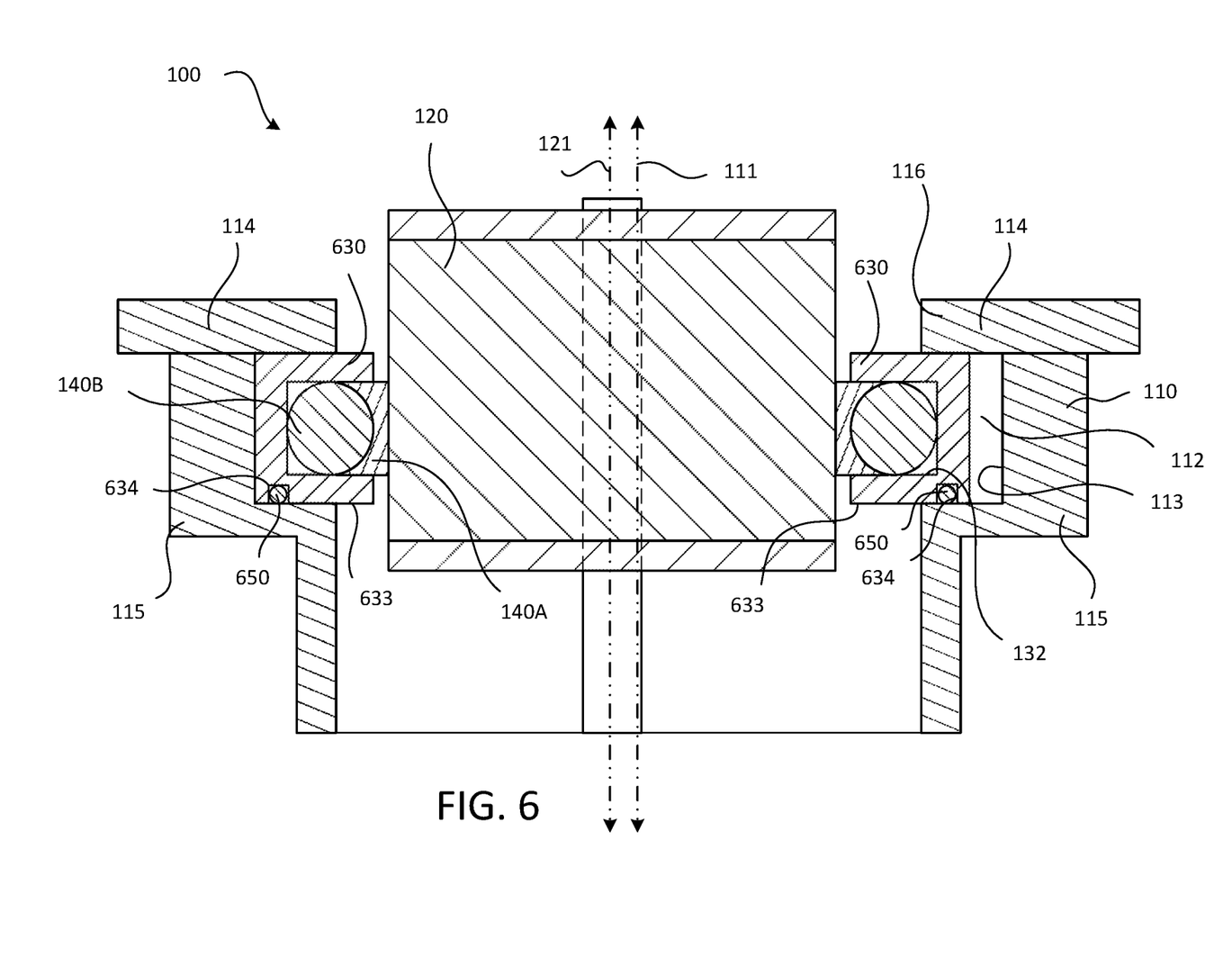
FIG. 6 is a cross-sectional view of a seal assembly, in accordance with various embodiments.

In various embodiments, and with reference to FIG. 6, an additional o-ring 650, or similar sealing feature, is disposed between a surface (e.g., lower surface 633) of the gland 630 and the housing 110. For example, the surface 633 of the gland 630 may define a channel 634 for retaining the o-ring 650. In various embodiments, engagement between the o-ring 650 and a surface of the housing 110 (e.g., an internal surface of the shoulder 115 of the housing 110) still allows for the gland 630 to slide and/or move laterally in response to deflection force but also facilitates the labyrinth-type seal between the gland 630 and the housing 610.

Figure 5:
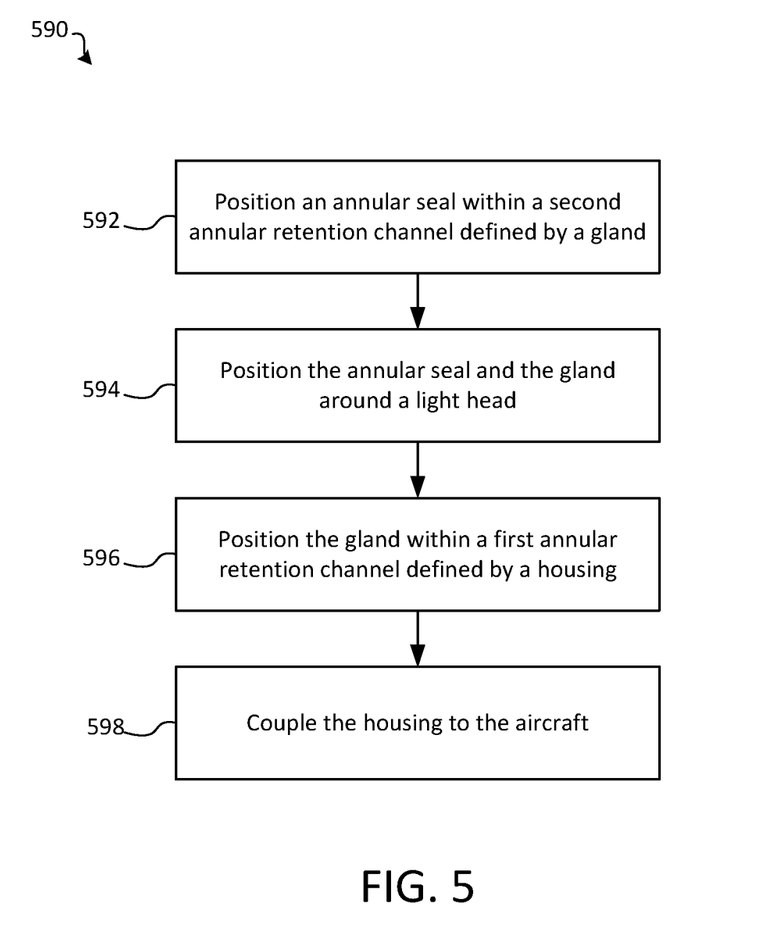
FIG. 5 is a schematic flow chart diagram of a method of manufacturing a light assembly of an aircraft, in accordance with various embodiments.

In various embodiments, and with reference to FIG. 5, a method 590 of manufacturing a light assembly of an aircraft is provided. The method 590 includes positioning an annular seal within a second annular retention channel defined by a gland at step 592. The method 590 further includes positioning the annular seal and the gland around a light head such that the annular seal is in sealing engagement with the light head at step 594. Still further, the method 590 may include positioning the gland within a first annular retention channel defined by a housing at step 596. This step 596 may include completing the first annular retention channel by coupling a retaining plate/flange to the housing to axially secure the gland within the channel. The method may further include coupling the housing to the aircraft at step 598. The method 590 may further include coupling the light head to a linear actuator or other axially displacing mechanism.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly comprising:
   a housing defining an opening and an annular retention channel;
   a shaft extending through the opening, the shaft comprising a longitudinal axis; and
   a gland disposed circumferentially around the shaft and movably retained within the annular retention channel, wherein the gland is movable relative to the housing in a direction substantially perpendicular to the longitudinal axis.

2. The seal assembly of claim 1, wherein movement of the gland refers to bulk movement of the gland such that the gland is configured to move in the direction as a whole.

3. The seal assembly of claim 1, wherein a maximum outer diameter of the gland, perpendicular to the longitudinal axis of the shaft, is less than a maximum inner diameter of the annular retention channel, perpendicular to the longitudinal axis of the shaft.

4. The seal assembly of claim 1, wherein the gland comprises a self-lubricating material.

5. The seal assembly of claim 1, wherein:
   engagement between surfaces of the gland and walls of the housing that define the annular retention channel form a labyrinth seal; and
   the labyrinth seal is maintained in response to movement of the gland in the direction.

6. The seal assembly of claim 1, wherein the gland is fixed relative to the shaft in the direction such that the shaft and the gland are configured to be movable in the direction together.

7. The seal assembly of claim 6, further comprising an annular seal disposed circumferentially around the shaft such that the annular seal is disposed between the gland and the shaft, wherein the annular seal is in sealing engagement with the shaft.

8. The seal assembly of claim 7, wherein:
   the annular retention channel defined by the housing is a first annular retention channel;
   the gland defines a second annular retention channel;
   the annular seal is disposed within the second annular retention channel.

9. The seal assembly of claim 7, wherein the shaft is configured to translate along the longitudinal axis relative to the housing, the gland, and the annular seal.

* * * * *